Aug. 7, 1945.  F. W. STEVENSON  2,381,783
CONVEYER FOR AUTOMOTIVE VEHICLES
Filed June 17, 1944  2 Sheets-Sheet 1

INVENTOR.
Francis W. Stevenson
BY
Barnes, Kisselle, Laughlin & Raisch
Attorneys

Aug. 7, 1945.   F. W. STEVENSON   2,381,783
CONVEYER FOR AUTOMOTIVE VEHICLES
Filed June 17, 1944   2 Sheets-Sheet 2

INVENTOR.
Francis W. Stevenson
BY Barnes, Kisselle, Laughlin & Raisch
Attorneys

Patented Aug. 7, 1945

2,381,783

UNITED STATES PATENT OFFICE 2,381,783

CONVEYER FOR AUTOMOTIVE VEHICLES

Francis W. Stevenson, Detroit, Mich.

Application June 17, 1944, Serial No. 540,775

7 Claims. (Cl. 214—83)

This invention relates to the handling of bulk material and it has to do particularly with the handling of bulk material which is trasported in trucks. Specifically, the invention is directed to the handling and conveying of coal, as this presents a general problem because of the wide use of coal as fuel although, of course, the invention is not limited to the handling of coal.

More particularly, the invention is directed to the handling of bulk material which is transported in trucks or truck trailers equipped with dumping bodies. Usually, the bodies are elevated so that the bulk material gravitates and is dumped from the body. In further considering the invention, reference will be made to the problems encountered in handling and hauling coal since this situation furnishes a good example. When a delivery of coal is made to a residence or a business house or the like, the dump body is elevated for the discharge of the coal. There are very few places where the coal can be dumped so that it falls directly into a bin or to the storage compartment. Accordingly, quite a large practice is either to dump the coal on the ground from where it has to be wheeled to the bin or storage compartment, or the coal may be dumped a little at a time into wheelbarrows and taken to the bin or storage compartment. This, of course, is time consuming and laborious and ties up expensive highway equipment where the coal is dumped a little at a time into wheelbarrows and then wheeled to the bin. It is, of course, uneconomical to have the truck lying inoperative during this period.

It has heretofore been proposed to use conveyers for conveying the coal from the dumping body to the place of ultimate discharge, such as a bin or storage compartment. These conveyers are of a portable nature and are usually of the belt type and are carried on the truck and trailer when in transit. Considerable difficulty has been encountered in the provision of power means for operating the conveyer, and some attempts have gone to rather great lengths to provide the power means for driving the conveyer. It has been proposed to employ a power take off from the truck or tractor engine and to run the power transmitting mechanism back through the truck body where it can be coupled to the conveyer. This runs into all kinds of difficulty as various structural elements interfere with the power transmission line and the rough handling to which such equipment is subjected results in the transmission line becoming broken or defective. It has been proposed to equip the conveyer with an electrical motor but this is only suitable for those places where an arrangement can be made to connect the motor to a suitable house current. Therefore, this arrangement has been limited to large contract hauling for commercial institutions where the electrical wiring can be installed for driving the conveyer motor. A still further proposal which has been employed is that of mounting on the conveyer a small gasoline engine. This not only makes the conveyer heavy and hard to handle but runs into great difficulty because the truck drivers are either unskilled or ill adapted to properly operate the small gasoline engine. If the engine doesn't start right away they begin to tinker with the adjustments and soon the engine is completely out of operating condition.

The principal object of this invention therefore, is to provide a simple portable means for driving the conveyer where the power is taken from the engine of the truck or tractor. This takes the form of a hydraulic system driven by a power take off and which system is completely closed and possesses no adjustable or exposed parts or mechanism with which the drivers can tamper. While the system is thus completely closed and constitutes a unit in itself the driving motor is arranged so that it can be quickly and easily attached and detached from the conveyer. Thus, all the driver has to do is make this mechanical coupling, which is a simple and easily made mechanical operation. In transit the driving motor may be stored in a suitable compartment separate from the conveyer and to this end the hydraulic system includes flexible lines, such as hose. Moreover, the arrangement affords for the disposition of the conveyer in most any position or angle relative to the vehicle. Where the vehicle has a hydraulic lift for the body the hydraulic system for operating the conveyer may be coupled into the hydraulic lift system, and by the use of a single diversion valve either the hydraulic lift or the conveyer driving motor may be operated as elected. These and other objects will be more fully appreciated as the following detailed description is considered in conjunction with the accompanying drawings:

Figure 1:
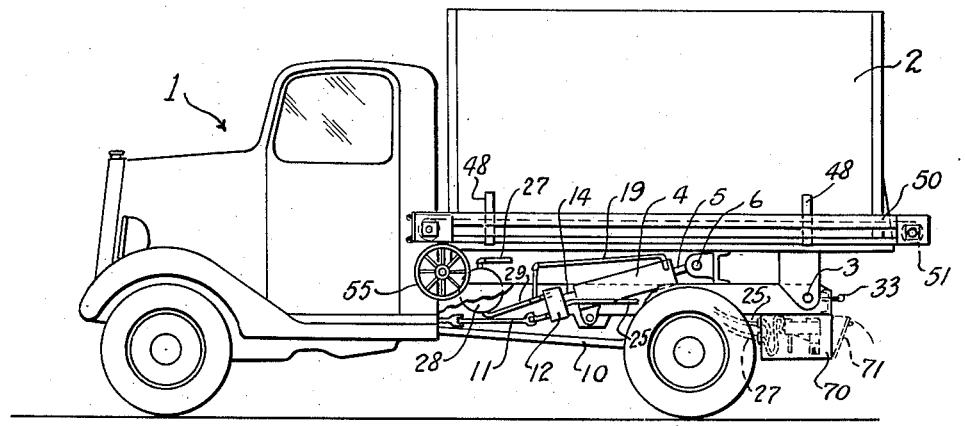
Fig. 1 is a side elevational view of a truck having a hydraulic lift and a conveyer driving system mounted thereon.
Figure 2:
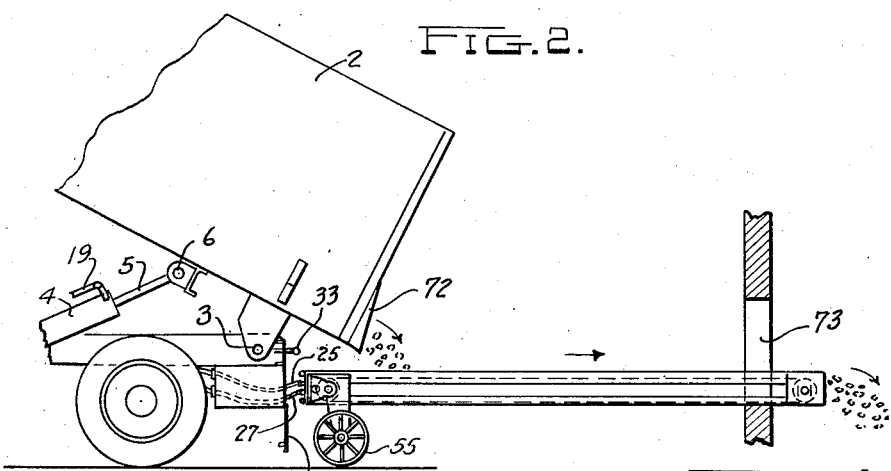
Fig. 2 is a view illustrating the operation of dumping bulk material onto the conveyer.

In Fig. 1 the automotive vehicle of the type commonly called a truck is generally illustrated at 1 provided with a body 2. The body is pivotally mounted as at 3 and is arranged to be elevated as shown in Fig. 2 hydraulically. This is by means of a cylinder 4 with a piston therein, the connecting rod 5 of which is pivotally connected to the body as at 6.

The drive shaft of the truck is shown at 10 and a power take off from the engine is illustrated at 11. The power take off is well known to those versed in the art and may be coupled to and released from the engine by suitable control means. The power take off drives a hydraulic pump 12 which may be attached directly to the cylinder 4.

Figure 6:
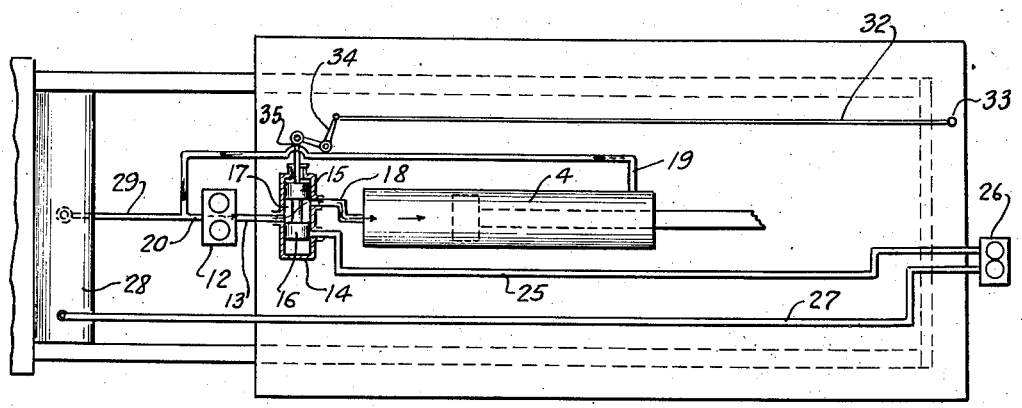
Fig. 6 is a diagrammatic view showing the hydraulic system.

In the diagrammatic illustration in Fig. 6, the outlet 13 from the pump leads into a diversion valve 14 shown as a conventional type of spool valve. Positioned within the valve chamber is a valve member having a land 15 and a land 16 with a port 17 therebetween. Leading from the valve is a pressure line 18 which extends to one end of the cylinder 4. A return line 19 extends from the other end of the cylinder to the inlet 20 for the pump. As shown in Fig. 1, the diversion valve may be coupled directly between the pump and the cylinder. With the valve positioned, as shown in Fig. 6, it will be observed that, with the operation of the pump 12, the liquid is pumped into the cylinder to elevate the dump body while the displaced liquid returns through line 19 to the inlet side of the pump. The sheer weight of the body is sufficient to cause it to lower and thus the pump 12 need not be reversible.

The hydraulic system for the operation of the conveyer, as shown in Fig. 6 is coupled into the hydraulic lift system and this embodies the use of the diversion valve. Leading from the diversion valve is a pressure line 25 which couples to a hydraulic motor 26. The pump 12 and the motor 6 may be similar or identical. A return line 27 extends from the motor 26 to a reservoir 28. A line 29 extends from the reservoir to the inlet 20 of the pump.

The control for the diversion valve may advantageously be operated from the rear end of the vehicle body so that the operator may stand at the rear of the vehicle and after getting the conveyer adjusted and the body elevated may shift the diversion valve for operation of the conveyer. A simple example of such a control mechanism resides in a shift rod 32, with the control handle 23, extending forwardly and connected to a bell crank 34 in turn connnected to the valve member by a rod 35.

With the valve positioned, as shown in Fig. 6, the pressure line 25 is closed and, therefore, if the pump is operated the liquid is pumped into one end of the hydraulic lift cylinder and displaced from the other end. When the valve is shifted to the position shown in Fig. 7, the pressure line 18 is closed and the pressure line 25 is open. The liquid is then pumped through the diversion valve through line 25 and through the hydraulic motor 26. The liquid is returned through line 27 through the reservoir 28 and back to the inlet side of the pump through line 29. It will be seen that insofar as the hydraulic lift is concerned, its operation requires only the transference of the pressure liquid from one end of the cylinder to the other and no reservoir is needed. However, to operate the hydraulic motor there must be a continual flow of liquid and the reservoir tank furnishes a body of liquid of sufficient capacity so as to prevent overheating.

Figure 3:
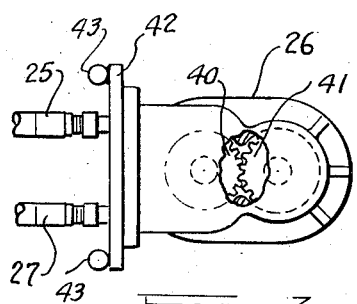
Fig. 3 is a detailed view with parts cut away showing the hydraulic motor.
Figure 4:
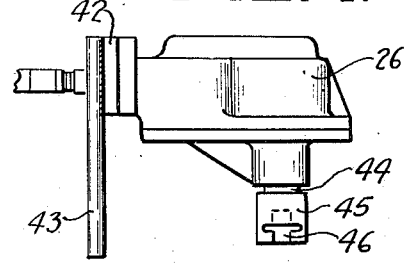
Fig. 4 is an elevational view of the motor.

The hydraulic motor 26, as shown in Figs. 3 and 4, may be of the gear type having gear members 40 and 41 with meshing teeth so that when liquid is supplied under pressure through the line 25, it causes the gears to rotate as the liquid passes therethough and back to the outlet line 27. This is a well known form of hydraulic device which may be used either as a pump or as a motor and further detailed description is unnecessary. The motor 26 is provided with a bracket 42 fixed thereto and mounted on this bracket are devices for mechanically coupling the motor to the conveyer. These take the form of rods 43. The shaft of one of the gears projects through the housing of the motor, as shown at 44, and is equipped with a suitable driving coupling 45 which may advantageously be a bayonet type of coupling as shown by the bayonet slot 46.

The conveyer may be carried on the body while in transit as illustrated in Fig. 1 for which the truck body may have suitable hangers 48. The conveyer has a suitable frame or body 50 provided with rollers 51 and 52 over which a suitable belt 53 operates. The belt may function between side walls 54 on the body of the conveyer. The conveyer may also have ground engaging wheels 55 to facilitate maneuvering the conveyer. The conveyer may be equipped with any suitable number of intermediate belt supporting rollers.

Figure 5:
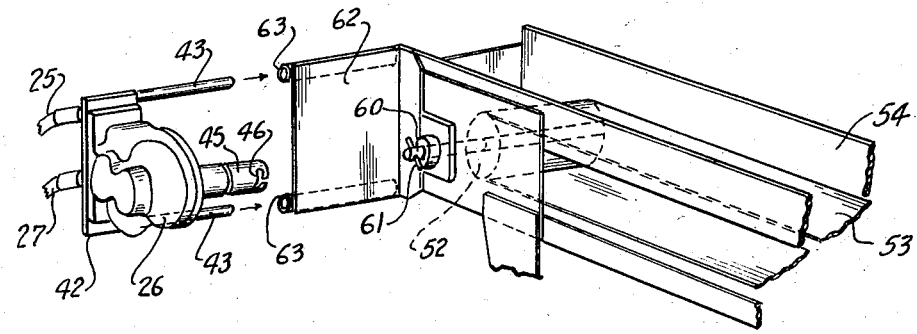
Fig. 5 is a view showing the conveyer and the hydraulic motor detached therefrom and in a position ready to be coupled to the conveyer.

As shown in Fig. 5, the roller 52 is the drive roller for the belt and it has its axis shaft projecting as at 60 and provided with a cross pin 61. This cross pin is to be coupled into the bayonet slot 46. Also mounted upon the conveyer is a bracket 62 for supporting two tubular support members 63. To couple the hydraulic motor to the conveyer the rods 43 are telescoped into the tubes 63. The coupling 45 is passed over the end of the shaft 61 and the pin 61 coupled into the bayonet slot 46. This structure holds the hydraulic motor securely mounted upon the conveyer and the bayonet coupling not only establishes a drive between the motor and the conveyer shaft but also prevents the motor from slipping outwardly.

The hydraulic lines 25 and 27 are preferably of flexible hydraulic hose and of sufficient length to permit manipulation of the conveyer and the motor so that the conveyer may be disposed at any angular relationship with respect to the body. At least the end portions of the hydraulic lines 25 and 27 are flexible and those portions which are positioned in the frame of the vehicle may be metallic pipe lines. A compartment is preferably positioned at the rear end of the vehicle, as shown at 70, and it may have a suitable door 71 for accommodating the motor 26 and the flexible hydraulic lines 25 and 27, or flexible portions thereof, when in transit.

When the vehicle is in transit the conveyer may be carried thereon after the manner shown in Fig. 1 and above described, the hydraulic motor and portions of the hydraulic lines are carried in the box or compartment. When a delivery is to be made the conveyer may be removed and placed to the rear of the body after the manner shown in Fig. 2, and the body elevated into dumping position. The hydraulic motor is removed from its compartment and coupled to the conveyer, as above described. It does not make any difference whether the body is elevated first or whether the hydraulic motor is coupled to the conveyer before the body is elevated. The conveyer, of course, is adjusted to the proper position angularly, and it may be arranged to elevate the coal.

Figure 7:
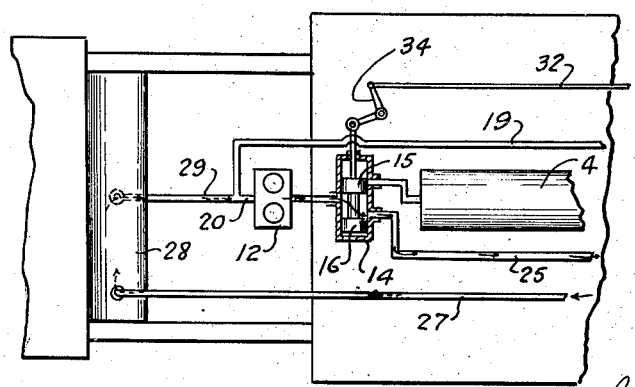
Fig. 7 is a partial view similar to Fig. 6 showing a different position of adjustment of the diversion valve.

The operator may now shift the diversion valve to the position as shown in Fig. 7, so that the hydraulic pump 12 is driven by the power take off 11 and circulates the liquid through the hydraulic system which includes the motor 26. This sets the conveyer into operation and then by controlling the suitable outlet door 72 at the rear of the dump body, the coal is dumped into the conveyer as shown in Fig. 2. The rate of discharge of the coal from the body may be regulated in accordance with the capacity of the conveyer to remove the coal. Thus, the coal may pass directly from the body into a suitable bin or the like, as shown at 73.

The accompanying drawings and description disclose the invention as embodied in a truck having a hydraulic lift mechanism for the body. It is within the invention to employ the hydraulic conveyer drive regardless of whether or not the body is elevated hydraulically. Moreover, the vehicle may be a trailer drawn by a tractor, in which event the pump will be driven by the engine of the tractor. In the claims appended hereto language is used which calls for an engine and this language includes a trailer since the trailer is hauled by the tractor engine.

I claim:

1. For an automotive vehicle having an engine, a body for carrying bulk material, said body having a discharge opening for the discharge of the bulk material and the engine having a power take off; a conveyer having a movable conveyer element adapted to be placed to receive material discharged from the body for conveying the material from the vehicle, a hydraulic system including a pump driven by the power take off, a rotary hydraulic motor in the system, hydraulic lines extending from the pump to the motor and including flexible hose for manipulation of the motor relative to the vehicle, means constructed and arranged to provide re-action to torque for detachably mounting the motor on the conveyer, said conveyer having a rotary driven element and a detachable driving coupling between the motor and said driven element.

2. For an automotive vehicle having an engine, a body for carrying bulk material, said body having a discharge opening for the discharge of the bulk material and the engine having a power take off; a hydraulic system mounted on the vehicle including a pump driven by the power take off, a rotary hydraulic motor in the system, hydraulic lines extending from the pump to the motor and including flexible portions whereby the motor may be manipulated relative to the vehicle, mounting means on the motor constructed and arranged to provide re-action to torque for detachably connecting the same to a conveyer structure which is adapted to be placed so as to receive discharge material, and a driving connection on the motor adapted to be detachably coupled to a rotary conveyer element to drive the same.

3. For an automotive vehicle having an engine, a body for carrying bulk material, said body having a discharge opening at the rear thereof for the discharge of bulk material and means for elevating the body for the discharge of the material through the opening, the engine having a power take off; a conveyer adapted to be placed under the opening to receive material discharged therefrom, said conveyer having a body, a movable conveying element and a rotary driven element for moving the same, a hydraulic system on the vehicle body including a pump driven by the power take off, a hydraulic motor in the system having a rotary driving part, hydraulic lines including flexible portions extending from the pump to the rear of the vehicle and connected to the motor so that the motor may be manipulated relative to the vehicle, cooperating mounting means on the conveyer body and the motor for detachably and non-rotatably mounting the motor on the conveyer body and detachable coupling means for connecting the rotary driving part of the motor to the rotary driven element of the conveyer.

4. For an automotive vehicle having an engine, a body for carrying bulk material, said body having a discharge opening at the rear thereof for the discharge of bulk material and means for elevating the body for the discharge of the material through the opening, the engine having a power take off; a conveyer adapted to be placed under the opening to receive material discharged therefrom, said conveyer having a body, a movable conveying element and a rotary driven element for moving the same, a hydraulic system on the vehicle body including a pump driven by the power take off, a hydraulic motor in the system having a rotary driving part, hydraulic lines including flexible portions extending from the pump to the rear of the vehicle and connected to the motor so that the motor may be manipulated relative to the vehicle, cooperating mounting means on the conveyer and the motor for detachably and non-rotatably mounting the motor on the conveyer body, detachable coupling means for connecting the driving part of the motor to the rotary driven element of the conveyer and control means operable at the rear of the vehicle adjacent the discharge opening operable to control the transmission of hydraulic liquid to the motor.

5. For an automotive vehicle having an engine, a body for carrying bulk material, said body having a discharge opening, the engine having a power take off, hydraulic means including a hydraulic pump driven by the power take off and lifting means operated by pumped liquid for elevating the body for the discharge of the material from the opening; a conveyer having a movable conveying element adapted to be placed so as to receive material discharged from said opening and having a driven element for the movable conveying element, a hydraulic system including a hydraulic motor, hydraulic lines extending to the motor including flexible portions so that the hydraulic motor may be manipulated relative to the vehicle, a diversion valve positioned between the pump and said lifting means and said hydraulic motor, cooperating means on the hydraulic motor and conveyer for detachably mounting the motor on the conveyer, a detachable coupling for connecting the motor with the driven element of the conveyer, and means operable for shifting the diversion valve to control the discharge of a pumped liquid selectively to the lifting means and the hydraulic motor.

6. For an automotive vehicle having an engine, a body for carrying bulk material, said body having a discharge opening, the engine having a power take off, hydraulic means including a hydraulic pump driven by the power take off and lifting means for elevating the body for the discharge of material from the opening; a conveyer having a movable conveying element adapted to be placed so as to receive material discharged from said opening and having a driven element for the movable conveying element, a hydraulic system including a hydraulic motor, hydraulic lines extending to the motor including flexible portions so that the hydraulic motor may be manipulated relative to the vehicle, a diversion valve positioned between the pump and said lifting means and said hydraulic motor, a reservoir tank in the hydraulic line between the hydraulic motor and the inlet side of the pump, cooperating means on the hydraulic motor and conveyer for detachably mounting the motor on the conveyer, a detachable coupling for connecting the motor with the driven element of the conveyer, and means operable for shifting the diversion valve to control the discharge of a pumped liquid selectively to the lifting means and the hydraulic motor.

7. For an automotive vehicle having an engine, a body for carrying bulk material, said body having a discharge opening for the discharge of bulk material therefrom, the engine having the power take off, in conjunction with a conveyer adapted to be placed so as to receive discharged material and having a rotary driven element for operating the conveyer; a hydraulic system including a pump, a hydraulic motor having a rotary driving part, said pump driven by the power take off, hydraulic lines connecting the pump and motor and including flexible portions adjacent the motor whereby the motor may be manipulated relative to the vehicle, means on the hydraulic motor for detachably and non-rotatably mounting the same on the conveyer and means for detachably connecting the rotary driving part of the motor to the rotary driven element of the conveyer.

FRANCIS W. STEVENSON.